US009849761B2

(12) United States Patent
Hiramatsu et al.

(10) Patent No.: US 9,849,761 B2
(45) Date of Patent: Dec. 26, 2017

(54) SUNROOF PANEL FOR VEHICLE

(71) Applicant: AISIN SEIKI KABUSHISIKI KAISHA, Kariya-shi, Aichi-ken (JP)

(72) Inventors: Shinichi Hiramatsu, Chiryu (JP); Akinao Yamaguchi, Nagoya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/266,218

(22) Filed: Sep. 15, 2016

(65) Prior Publication Data

US 2017/0087967 A1 Mar. 30, 2017

(30) Foreign Application Priority Data

Sep. 24, 2015 (JP) .................. 2015-187374

(51) Int. Cl.
*B60J 7/043* (2006.01)
(52) U.S. Cl.
CPC .................. *B60J 7/043* (2013.01)
(58) Field of Classification Search
CPC ......................................... B60J 7/043
USPC .......................... 296/296.01–224
See application file for complete search history.

(56) References Cited

U.S. PATENT DOCUMENTS

| 5,813,592 | A | 9/1998 | Midling et al. |
| 6,270,154 | B1 * | 8/2001 | Farber .................... B60J 7/047 296/213 |
| 7,658,441 | B2 * | 2/2010 | Rich ..................... B60J 10/82 296/216.09 |
| 2002/0113466 | A1 * | 8/2002 | Bohm ..................... B60J 7/00 296/216.01 |
| 2007/0246973 | A1 * | 10/2007 | Huebner .................. B60J 7/00 296/216.09 |
| 2014/0248510 | A1 * | 9/2014 | Sayama ................ B32B 15/012 428/653 |

FOREIGN PATENT DOCUMENTS

| DE | 199 18 150 C5 | 10/2000 |
| DE | 10 2008 054 159 A1 | 5/2010 |
| JP | 2792233 | 9/1998 |

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A sunroof panel for a vehicle includes a panel, a reinforcement member including a pair of side frames, a front frame, and a rear frame, and a joint portion joining first distal ends of the side frames to distal ends of the front frame, respectively, the joint portion joining second distal ends of the side frames to distal ends of the rear frame, respectively. At least one of the pair of side frames, the front frame and the rear frame is made from a material that includes a specific gravity less than a specific gravity of the others of the pair of side frames, the front frame and the rear frame.

5 Claims, 3 Drawing Sheets

SUNROOF PANEL FOR VEHICLE

CROSS REFERENCE TO RELATED APPLICATIONS

This application is based on and claims priority under 35 U.S.C. §119 to Japanese Patent Application 2015-187374, filed on Sep. 24, 2015, the entire content of which is incorporated herein by reference.

TECHNICAL FIELD

This disclosure generally relates to a sunroof panel for a vehicle.

BACKGROUND DISCUSSION

Various sunroof panels for vehicles, for example, a sunroof panel for a vehicle disclosed in DE102008054159B (hereinafter, referred to as Patent reference 1), are known. The sunroof panel for the vehicle disclosed in Patent reference 1 includes, for example, a glass-made, or a resin-made design panel (a panel), and a frame-shaped reinforcement member joined to a lower surface of the design panel along a peripheral rim portion thereof. Accordingly, because the flexural rigidity of the sunroof panel for the vehicle increases, the required strength may be secured.

Meanwhile, the reinforcement member of such sunroof panel for the vehicle disclosed in Patent reference 1 is generally made of iron, which leads to the increase in weight of the sunroof panel for the vehicle. Here, a reinforcement member is formed with plural frames that is joined to the lower surface of the design panel so as to be, as a whole, formed in a substantially frame shape.
In a case where a part of the plural frames, the part that has a low required strength, is made from a different material (for example, resin) including a less specific gravity, the weight of the sunroof panel may be reduced.

However, because the reinforcement member is formed such that the frames that are adjacent to one another are not continuously provided, a problem in which the flexural rigidity of the sunroof panel for the vehicle may be impaired occurs.

A need thus exists for a sunroof panel for a vehicle which is not susceptible to the drawback mentioned above.

SUMMARY

According to an aspect of this disclosure, a sunroof panel for a vehicle includes a panel for closing an opening being provided at a roof of the vehicle, a reinforcement member including a pair of side frames being joined to a lower surface of the panel along opposing rim portions of the panel in a vehicle width direction, the reinforcement member including a front frame being joined to the lower surface of the panel along a front rim portion of the panel, the reinforcement member including a rear frame being joined to the lower surface of the panel along a rear rim portion of the panel, and a joint portion joining first distal ends of the side frames to distal ends of the front frame, respectively, the joint portion joining second distal ends of the side frames to distal ends of the rear frame, respectively. At least one of the pair of the side frames, the front frame and the rear frame is made from a material that includes a specific gravity less than a specific gravity of the others of the pair of the side frames, the front frame and the rear frame.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
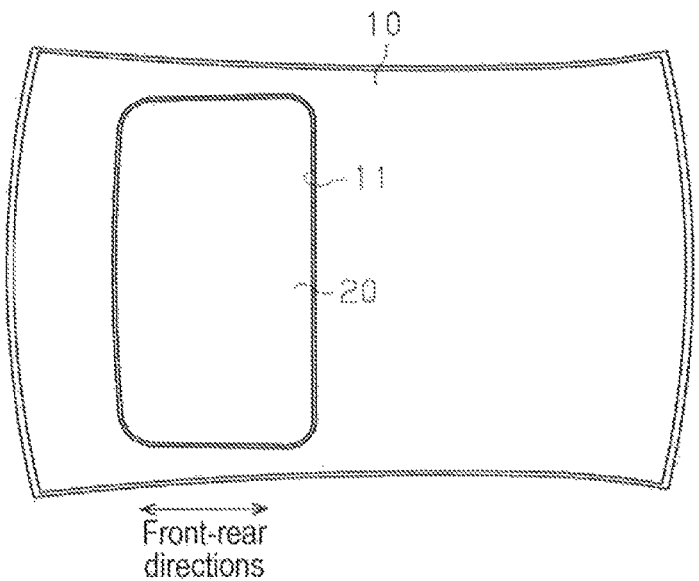
FIG. 1 is a plan view illustrating a structure of a sunroof panel for a vehicle according to a first embodiment disclosed here.
Figure 2:
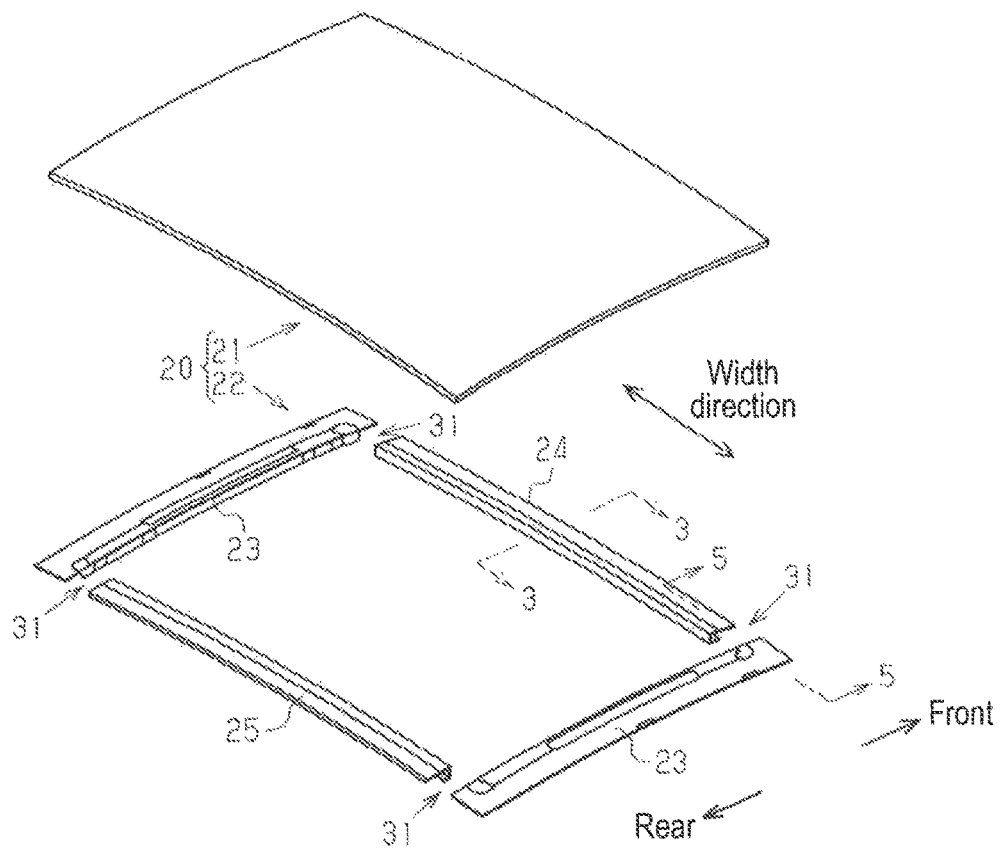
FIG. 2 is an exploded view illustrating the structure of the sunroof panel for the vehicle according to the first embodiment.

Hereinafter, embodiments of a sunroof panel for a vehicle will be explained. Front-rear directions of the vehicle hereinafter are referred to as front-rear directions. As shown in FIGS. 1 and 2, a roof 10 of the vehicle, for example, an automobile, is provided with a substantially quadrilateral opening 11 and a substantially quadrilateral sunroof panel 20 for the vehicle, the sunroof panel 20 opening and closing the opening 11. The sunroof panel 20 for the vehicle includes a panel 21 and a reinforcement member 22. The panel 21 is made from a glass-made, or a resin-made transparent material that is formed in a substantially quadrilateral plate shape so as to fit the shape of the opening 11. The reinforcement member 22 is formed in a substantially quadrilateral annular shape being provided at a lower portion of the panel 21 along an outer peripheral rim portion of the panel 21.

The reinforcement member 22 includes a pair of side frames 23, a front frame 24, and a rear frame 25. The side frames 23 are joined to a lower surface of the panel 21 along side rim portions of the panel 21 in a vehicle width direction. The front frame 24 is joined to the lower surface of the panel 21 along a front rim portion of the panel 21. The rear frame 25 is joined to the lower surface of the panel 21 along a rear rim portion of the panel 21. The side frame 23 extending in front-rear directions corresponds to a mounting portion of the sunroof panel 20 for the vehicle relative to the roof 10. The side frame 23 is made from, for example, a press material made from a steel plate for securing the required strength. Each of the front frame 24 and the rear frame 25 extending in the vehicle width direction is made from an extruded material of, for example, aluminum alloy (a material that includes a specific gravity less than a material of the side frame 23) for weight reduction. That is, the front frame 24 and the rear frame 25 include constant cross-sectional surfaces, respectively, in the longitudinal direction of the front frame 24 and the rear frame 25 (in the vehicle width direction).

Figure 3:
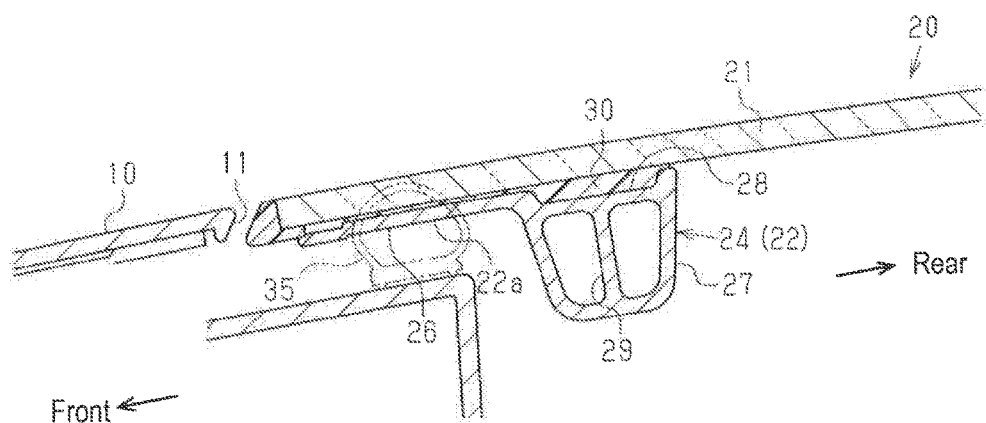
FIG. 3 is a cross-sectional view taken along line III-III in FIG. 2.

As shown in FIG. 3, the front frame 24 integrally includes a flat portion 26, a substantially U-shaped groove portion 27, a lid portion 28, and a rib 29. The flat portion 26 extends in the front-rear directions along the panel 21. The groove portion 27 is connected to a rear end of the flat portion 26 and recesses downwardly relative to the flat portion 26 (the panel 21). The lid portion 28 connects opening ends of the groove portion in the front-rear directions, and closes an upper portion of the lid portion 28. The rib 29 protrudes upwardly from a center portion of a bottom surface of the groove portion 27 in the front-rear directions. Because the rib 29 divides a substantially quadrilateral space into two in the front-rear directions by being connected to the lid portion 28 at an upper end, the substantially quadrilateral space defined by the groove portion 27 and the lid portion 29. The flat portion 26, the groove portion 27, the lid portion 28, and the rib 29 extend along a rim portion (a front rim portion) of the panel 21. Because the section modulus increases due to the shape of the closed cross section, the front frame 24 secures the required strength while suppressing an increase in mass. The front frame 24 is joined to the panel 21 by, for example, a urethane-made glue 30 being applied to a position between a set of upper surfaces of the flat portion 26 and the lid portion 28, and a lower surface of the panel 21. The rear frame 25 is formed similarly to the front frame 24 and, as is similar to the front frame 24, is joined to the panel 21.

Each of the side frames 23 is joined to the panel 21 with a glue 30 applied to a portion between the upper surface of the side frame 23 and the lower surface of the panel 21. That is, the reinforcement member 22 is joined to the lower surface of the panel 21 with the glue 30 applied over the whole periphery of the upper surface of the reinforcement member 22.

Figure 4:
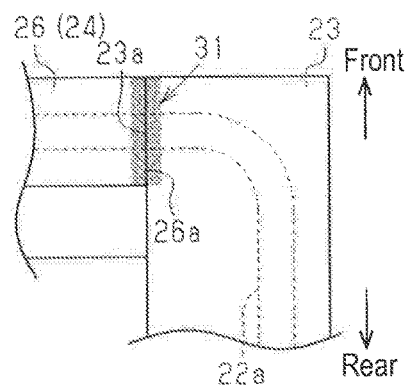
FIG. 4 is an enlarged plan view illustrating the structure of the sunroof panel for the vehicle according to the first embodiment.
Figure 5:
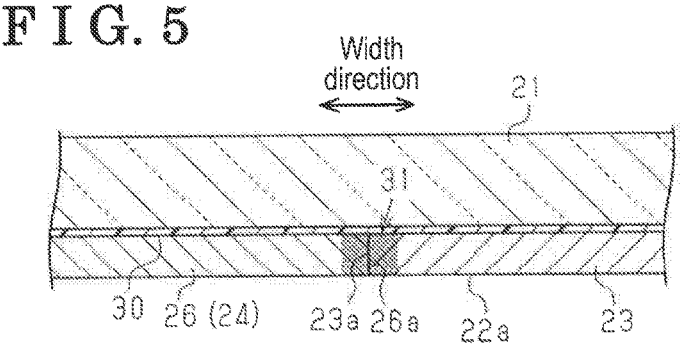
FIG. 5 is a cross-sectional view taken along line V-V in FIG. 2.

As shown in FIGS. 4 and 5, a front end portion of the side frame 23 and a distal end portion of the flat portion 26 are joined with each other by, for example, friction stir welding, or FSW in a state where a distal end surface 26a of the flat portion 26 is closely located to a facing surface 23a of the side frame 23. A joint portion 31 (shown with a pattern for convenience of explanation in FIGS. 4 and 5) includes a line that extends in a straight manner in the front-rear directions when viewed in a plan view. The front end portion of the side frame 23 includes a plate thickness that is the same, or substantially the same as a plate thickness of the distal end portion of the flat portion 26. The upper surface and the lower surface of the front end portion of the side frame 23 are joined to the upper surface and the lower surface of the distal end portion of the flat portion 26, respectively, so as to be substantially flush with, or so as to be continuously provided with the upper surface and the lower surface of the distal end portion of the flat portion 26. A rear end portion of the side frame 23 is joined to a distal end of the flat portion 26 of the rear frame 25 so as to be substantially flush with, or so as to be continuously provided with the distal end of the flat portion 26 of the rear frame 25. That is, the front end portions of the side frames 23 are joined to the distal end portions of the front frames 24 (the flat portions 26), respectively, so as to be substantially flush with, or so as to be continuously provided with the distal end portions of the front frames 24, respectively, at the joint portions 31. The rear end portions of the side frames 23 are joined to the distal end portions of the rear frames 25 (the flat portions 26), respectively, so as to be substantially flush with, or so as to be continuously provided with the distal end portions of the rear frames 25, respectively, at the joint portions 31.

As shown in FIG. 3, a weatherstrip 35 is provided at a lower portion of the flat portion 26 of the front frame 24. The weatherstrip 35 is made from an extruded material, for example, a synthetic rubber of, for example, an Ethylene Propylene Dien Monomer rubber, or EPDM, or a Thermo Plastic Elastomer, or a TPE. The weatherstrip 35 as a whole is formed in a substantially quadrilateral ring shape along the reinforcement member 22. That is, the weatherstrip 35 extends in the vehicle width direction at lower portions of the flat portions 26 of the front frame 24 and of the rear frame 25, respectively. The weatherstrip 35 is liquid-tightly contacted to the lower surfaces of the flat portions 26 of the front frame 24 and of the rear frame 25, respectively. The weatherstrip 35 extends in the front-rear directions at lower portions of the side frames 23, respectively. The weatherstrip 35 is liquid-tightly contacted to the lower surfaces of the side frames 23. Accordingly, the weatherstrip 35 inhibits water, for example, rainwater, from entering into an inner periphery of the reinforcement member 22 over a periphery of the reinforcement member 22. The lower surface of the reinforcement member 22 that is in contact with the weatherstrip 35 is provided with a sealing surface 22a.

As shown in FIG. 4, the sealing surface 22a (the weatherstrip 35) enters into the side frame 23 from the flat portion 26 of the front frame 24 via the joint portion 31. The sealing surface 22a is provided at a portion between the flat portion 26 of the rear frame 25 and the side frame 23. As described above, the front end portions of the side frames 23 are joined to the distal end portions of the front frames 24 (the flat portions 26), respectively, so that respective lower surfaces of the front end portions of the side frames 23 are substantially flush with, or are continuously provided with respective lower surfaces of the distal end portions of the front frames 24, respectively, at the joint portions 31. The rear end portions of the side frames 23 are joined to the distal end portions of the rear frames 25 (the flat portions 26), respectively, so that respective lower surfaces of the rear end portions of the side frames 23 are substantially flush with, or are continuously provided with lower surfaces of the distal end portions of the rear frames 25, respectively, at the joint portions 31. Accordingly, the sealing surfaces 22a of the reinforcement members 22 are substantially flush with one another, or are continuously provided with each other including the joint portions 31.

According to the first embodiment, following effects and advantages may be attained.

According to the first embodiment, because the front frame 24 and the rear frame 25 are made from a material (aluminum alloy) that includes the specific gravity lower than the material (the steel plate) of the side frames 23, the weight of the sunroof panel 20 for the vehicle may be reduced comparing to a case where the front frame 24 and the rear frame 25 are made from the material that includes the same, or substantially same specific gravity. The reinforcement member 22 is configured such that the side frames 23 and the distal ends of the front frame 24 are joined with one another with the joint portions 31, respectively, and the side frames 23 and the distal ends of the rear frame 25 are joined with one another with the joint portions 31, respectively. Accordingly, the reinforcement member 22 is joined to the lower surface of the panel 21 as a single component. Thus, the flexural rigidity of the sunroof panel 20 for the vehicle is enhanced.

Because each of the front frame 24 and the rear frame 25 includes the groove portion 27, the lid portion 28, and the rib 29, the section modulus may be enhanced while reducing the size of the groove portion 27 in the upper-lower directions. Accordingly, the flexural rigidity of the sunroof panel 20 for the vehicle may be further enhanced. Because the size of the groove portion 27 in the upper-lower directions is reduced, an interference of the groove portion 27 relative to peripheral components may be reduced. Accordingly, the sunroof panel 20 for the vehicle may be disposed further flexibly. Moreover, each of the front frame 24 and the rear frame 25 may secure higher rigidity than a frame (a reinforcement member) that is made from, for example, a stamp molded body made of a steel plate, and that is formed the same, or substantially the same (outer shape) as the front frame 24 or the rear frame 25.

According to the first embodiment, each of the side frames 23 is made from a steel plate, the side frame 23 that requires the tensile strength as a mounting portion of the sunroof panel 20 for the vehicle relative to the roof 10. Each of the front frame 24 and the rear frame 25 is made of aluminum alloy, the front frame 24 and the rear frame 25 that require the flexural rigidity. Accordingly, the weight of the sunroof panel 20 for the vehicle may be reduced while securing the strength required in accordance with a position of the panel 21.

According to the first embodiment, because the sealing surfaces 22a are flush with each other (do not have a level difference) at the joint portion 31, the weatherstrip 35 may inhibit water, for example, rain water from entering into the inner periphery of the reinforcement member 22 caused by a gap between the weatherstrips 35.

Figure 6:
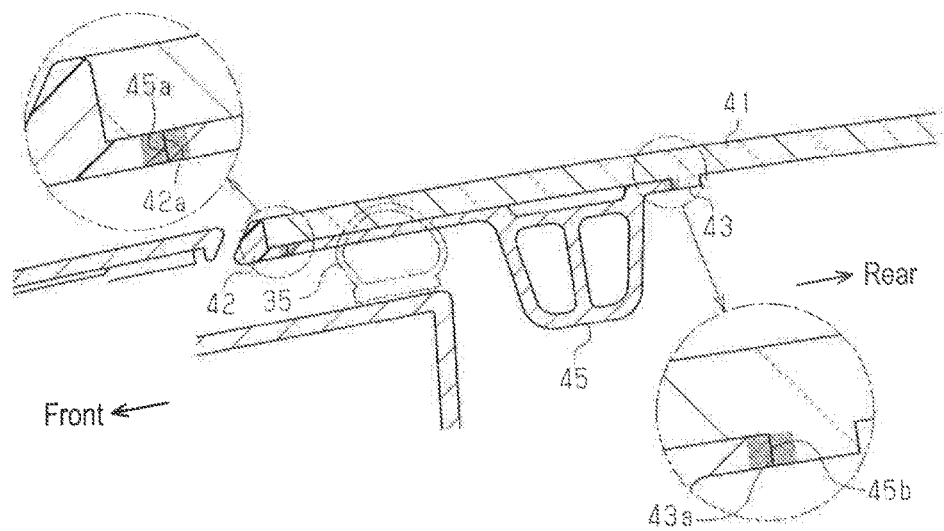
FIG. 6 is a cross-sectional view illustrating a structure of a sunroof panel for a vehicle according to a second embodiment.

The aforementioned first embodiment may be modified as follows. According to a second embodiment, as shown in FIG. 6, in a case where, at least, a rim portion of a panel 41 is made of resin, a substantially-quadrilateral-annular outer rib 42 may be integrally and protrudingly provided at a lower portion of the rim portion over the whole periphery of the rim portion, and a substantially-quadrilateral-annular inner rib 43 may be integrally formed and protrudingly provided at the lower portion of the rim portion while being spaced apart from an inner periphery of the outer rib 42. Facing surfaces of the outer rib 42 and the inner rib 43 are provided with joint surfaces 42a, 43a, respectively. An outer surface 45a (i.e., serving as a second end surface) of a front frame 45 (or a rear frame) (an end surface of the front frame 45, the end surface being disposed at an end of the panel 41) that is formed the same, or substantially the same as the front frame 24 may be directly joined to the joint surface 42a. In addition, an inner surface 45b (i.e., serving as a first end surface) of the front frame 45 (an end surface of the front frame 45, the end surface being disposed at a portion closer to a center portion relative to an edge portion of the panel 41) may be directly joined to the joint surface 43a (shown with a pattern for convenience of explanation in FIG. 6).

In this case, because a protrusion length of the outer rib 42 matches to a plate thickness of the front frame 45 at the outer surface 45a, the joint portions of the outer rib 42 and of the front frame 45 are flush with each other (have a smooth surface). Because a protrusion length of the inner rib 43 matches to the plate thickness of the front frame 45 at the inner surface 45b, the joint portions of the inner rib 43 and of the front frame 45 are flush with each other (have a smooth surface). Because overlapped molding portions made of the glue 30 or resin (for example, urethane resin) being sandwiched between the panel 41 and the front frame 45 in the upper-lower directions for joining the panel 41 to the front frame 45 are not required, the thickness of the sunroof panel 20 for the vehicle may be reduced, and accordingly, an arrangement space of the panel 41 and the front frame 45 in the upper-lower directions may be reduced. An arrangement space of the weatherstrip 35 may be favorably secured.

Figure 7A:
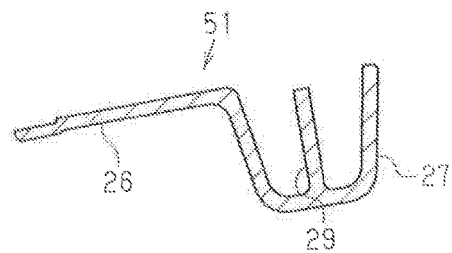
FIG. 7A is a cross-sectional view illustrating a structure of a sunroof panel for a vehicle according to a third embodiment.
Figure 7B:
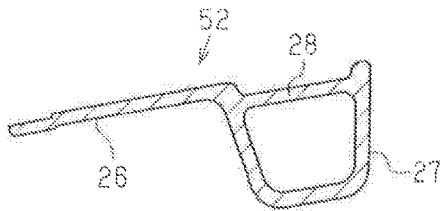
FIG. 7B is another cross-sectional view illustrating a structure of a sunroof panel for a vehicle according to a fourth embodiment.

According to a third embodiment, as shown in FIG. 7A, a front frame 51 (or a rear frame) that does not include the lid portion 28, and that includes a substantially constant cross section is applicable. According to a fourth embodiment, as shown in FIG. 7B, a front frame 52 (or a rear frame) that does not include the rib 29, and that includes a substantially constant cross section is applicable. In both cases, the section modulus may be increased while reducing the dimension of the groove portion 27 in the upper-lower directions. Accordingly, the flexural rigidness of the sunroof panel 20 for the vehicle may be further enhanced. Moreover, the cross section of the front frame (or the rear frame) may be changed desirably.

Figure 8A:
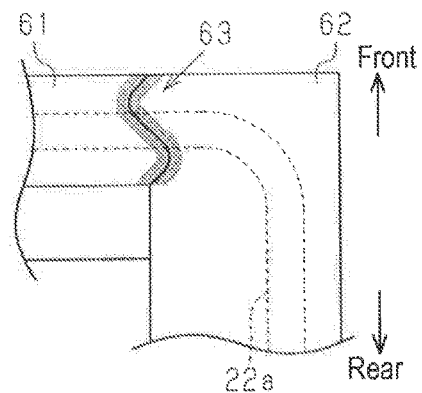
FIG. 8A is an enlarged plan view illustrating a structure of a sunroof panel for a vehicle according to a fifth embodiment.
Figure 8B:
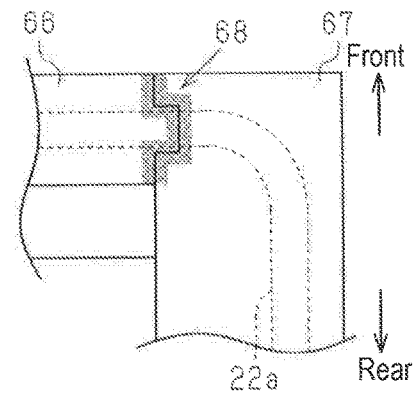
FIG. 8B is another enlarged plan view illustrating a structure of a sunroof panel for a vehicle according to a sixth embodiment.

According to the aforementioned embodiment, the joint portion 31 includes the line that extends in the straight manner when viewed in a plan view. Alternatively, according to a fifth embodiment, a join portion including a line that does not extend in a straight manner is applicable. For example, as shown in FIG. 8A, a line of a joint portion 63 disposed between a flat portion 61 that corresponds to the flat portion 26 and a side frame 62 that corresponds to the side frame 23 may extend in a S-shape when viewed in a plan view. Alternatively, according to a sixth embodiment, as shown in FIG. 8B, a line of a joint portion 68 disposed between a flat portion 66 that corresponds to the flat portion 26 and a side frame 67 that corresponds to the side frame 23 may extend in a crank shape (a hook shape) when viewed in a plan view. Furthermore, lines extending at all of the joint portions disposed at the four corners of the reinforcement member 22 do not have to be the same as one another. For example, a line may extend in a straight manner at a joint portion disposed at one of the four corners of the reinforcement member 22, and a line may be curved at the rest of the joint portions.

As such, because contact areas of the distal end of the side frame 62, 67, and the distal end of the flat portion 61, 66 (the front frame or the rear frame) are increased, the joint strength (a tensile strength) may be increased. In a case where the sunroof panel 20 for the vehicle is bent by, for example, an outer input, a stress may be dispersed. Accordingly, the flexural rigidity of the sunroof panel 20 for the vehicle may be further enhanced.

At least one of the front frame 24 and the rear frame 25 may be made of lightweight metal other than resin or aluminum alloy.

At least one of the front frame 24 and the rear frame 25 may not be made from an extruded material.

At least one of the front frame 24 and the rear frame 25 may be made from a steel plate that is the same, or substantially the same as the side frame 23.

The sunroof panel 20 for the vehicle may correspond to a fixed panel that normally closes the opening 11.

Next, technical ideas that may be adopted from the aforementioned embodiments will hereunder be described.

A sunroof panel for a vehicle includes side frames that are made from steel plates, and front and rear frames that are made from extruding materials of aluminum alloy.

According to the aforementioned embodiment, the sunroof panel (20) for a vehicle includes the panel (21, 41) for closing the opening being provided at the roof of the vehicle, the reinforcement member (22) including the pair of side frames (23, 62, 67) being joined to the lower surface of the panel (21, 41) along opposing rim portions of the panel (21, 41) in the vehicle width direction, the reinforcement member (22) including the front frame (24, 45, 51, 52) being joined to the lower surface of the panel (21, 41) along the front rim portion of the panel (21, 41), the reinforcement member (22) including the rear frame (25, 45, 51, 52) being joined to the lower surface of the panel (21, 41) along the rear rim portion of the panel (21, 41), and the joint portion (31, 63, 68) joining the first distal ends of the side frames (23, 62, 67) to the distal ends of the front frame (24, 45, 51, 52), respectively, the joint portion (31, 63, 68) joining the second distal ends of the side frames (23, 62, 67) to the distal ends of the rear frame (25, 45, 51, 52), respectively. At least one of the pair of the side frames (23, 62, 67), the front frame (24, 45, 51, 52) and the rear frame (25, 45, 51, 52) is made from the material that includes the specific gravity less than the specific gravity of the others of the pair of the side frames (23, 62, 67), the front frame (24, 45, 51, 52) and the rear frame (25, 45, 51, 52).

According to the aforementioned construction, because at least one of the materials of the side frame 23, 62, 67, the front frame 24, 45, 51, 52, and the rear frame 25, 45, 51, 52 is made from a material that includes the specific gravity lower than the rest of the materials of the side frame 23, 62, 67, the front frame 24, 45, 51, 52, and the rear frame 25, 45, 51, 52, the weight of the sunroof panel 20 for the vehicle may be reduced comparing to a case where the side frame 23, 62, 67, the front frame 24, 45, 51, 52 and the rear frame 25, 45, 51, 52 are made from the material that includes the same, or substantially same specific gravity. The reinforcement member 22 is configured such that the side frames 23, 62, 67 and the distal ends of the front frame 24, 45, 51, 52 are joined with one another with the joint portions 31, respectively, and the side frames 23, 62, 67 and the distal ends of the rear frame 25, 45, 51, 52 are joined with one another with the joint portions 31, 63, 68 respectively. Accordingly, the reinforcement member 22 is joined to the lower surface of the panel 21, 41 as a single component. Thus, the flexural rigidity of the sunroof panel 20 for the vehicle is enhanced.

According to the aforementioned embodiment, the reinforcement member (22) includes the groove portion (27) being provided along the rim portion of the panel (21, 41), the groove portion (27) being recessed downwardly relative to the panel (21, 41), and at least one of the lid portion (28) and the rib (29), the lid portion (28) being provided along the rim portion of the panel (21, 41), the lid portion (28) closing the upper portion of the groove portion (27), the rib (29) being provided along the rim portion of the panel (21, 41), the rib (29) protruding upwardly from the bottom surface of the groove portion (27).

According to the aforementioned construction, because each of the front frame 24, 45, 51, 52 and the rear frame 25, 45, 51, 52 includes the groove portion 27, the lid portion 28, and the rib 29, the section modulus may be enhanced while reducing the size of the groove portion 27 in the upper-lower directions. Accordingly, the flexural rigidity of the sunroof panel 20 for the vehicle may be further enhanced.

According to the aforementioned embodiment, the joint portion (63, 68) includes the line that extends in a non-straight manner when viewed in the plan view.

According to the aforementioned construction, because the line of the joint portion 63, 68 does not extend in the straight manner (for example, extends in a curved shape), the contact areas of the side frame 62, 67 and the distal end of the front frame 24, 45, 51, 52, and the side frame 62, 67 and the distal end of the rear frame 25, 45, 51, 52 are increased. Accordingly, the joint strength may be increased.

According to the aforementioned embodiment, the panel (41) is made of resin. The reinforcement member (22) includes the first end surface (45b) being disposed at the portion closer to a center portion relative to the edge portion of the panel (41) and the second end surface (45a) being disposed at the edge portion of the panel (41), the reinforcement member (22) being joined to the panel (41) at the first end surface (45b) and the second end surface (45a).

According to the aforementioned construction, because the glue 30 being sandwiched between the panel 41 and the reinforcement member 22 in the upper-lower directions for joining the panel 41 to the reinforcement member 22, the thickness of the sunroof panel 20 for the vehicle may be reduced, and accordingly, an arrangement space of the panel 41 and the reinforcement member 22 in the upper-lower directions may be reduced.

According to the aforementioned embodiment, the pair of the side frames (23, 62, 67) extends in front-rear directions of the vehicle. The front frame (24, 45, 51, 52) extends in the vehicle width direction. The rear frame (25, 45, 51, 52) extends in the vehicle width direction. The front frame (24, 45, 51, 52) and the rear frame (25, 45, 51, 52) are made from materials that each includes the specific gravity less than the specific gravity of the material of the pair of the side frames (23, 62, 67).

According to the aforementioned construction, because at least one of the materials of the side frame 23, 62, 67, the front frame 24, 45, 51, 52, and the rear frame 25, 45, 51, 52 is made from a material that includes the specific gravity lower than the rest of the materials of the side frame 23, 62, 67, the front frame 24, 45, 51, 52 and the rear frame 25, 45, 51, 52, the weight of the sunroof panel 20 for the vehicle may be reduced comparing to a case where the side frame 23, 62, 67 the front frame 24, 45, 51, 52 and the rear frame 25, 45, 51, 52 are made from the material that includes the same, or substantially same specific gravity.

According to the aforementioned embodiment, the pair of the side frames (23, 62, 67) extends in a lateral direction of the vehicle. The front frame (24, 45, 51, 52) extends in a longitudinal direction of the vehicle. The rear frame (25, 45, 51, 52) extends in the longitudinal direction of the vehicle. The front frame (24, 45, 51, 52) and the rear frame (25, 45, 51, 52) are made from materials that each includes the specific gravity less than the specific gravity of the material of the pair of the side frames (23, 62, 67).

According to the aforementioned construction, because at least one of the materials of the side frame 23, 62, 67, the front frame 24, 45, 51, 52, and the rear frame 25, 45, 51, 52 is made from a material that includes the specific gravity lower than the rest of the materials of the side frame 23, 62, 67, the front frame 24, 45, 51, 52 and the rear frame 25, 45, 51, 52, the weight of the sunroof panel 20 for the vehicle may be reduced comparing to a case where the side frame 23, 62, 67 the front frame 24, 45, 51, 52 and the rear frame 25, 45, 51, 52 are made from the material that includes the same, or substantially same specific gravity.

The principles, preferred embodiment and mode of operation of the present invention have been described in the foregoing specification. However, the Invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunroof panel for a vehicle, comprising:
a panel for closing an opening being provided at a roof of the vehicle;
a reinforcement member including a pair of side frames being joined to a lower surface of the panel along opposing rim portions of the panel in a vehicle width direction, the reinforcement member including a front frame being joined to the lower surface of the panel along a front rim portion of the panel, the reinforcement member including a rear frame being joined to the lower surface of the panel along a rear rim portion of the panel; and
a joint portion joining first distal ends of the side frames to distal ends of the front frame, respectively, the joint portion joining second distal ends of the side frames to distal ends of the rear frame, respectively; wherein
at least one of the pair of the side frames, the front frame and the rear frame is made from a material that includes a specific gravity less than a specific gravity of the others of the pair of the side frames, the front frame and the rear frame, and
at the joint portions, respective lower surfaces of first distal ends of the side frames and respective lower surfaces of distal ends of the front frame are substantially flush with each other, and respective lower surfaces of second distal ends of the side frames and respective lower surfaces of distal ends of the rear frame are substantially flush with each other.

2. The sunroof panel for the vehicle according to claim 1, wherein the reinforcement member includes;
a groove portion being provided along the rim portion of the panel, the groove portion being recessed downwardly relative to the panel; and
at least one of a lid portion and a rib, the lid portion being provided along the rim portion of
the panel, the lid portion closing an upper portion of the groove portion, the rib being provided along the rim portion of the panel, the rib protruding upwardly from a bottom surface of the groove portion.

3. The sunroof panel for the vehicle according to claim 1, wherein the joint portion includes a line that extends in a non-straight manner when viewed in a plan view.

4. The sunroof panel for the vehicle according to claim 1, wherein
the panel is made of resin; and
the reinforcement member includes a first end surface being disposed at a portion closer to a center portion relative to an edge portion of the panel and a second end surface being disposed at the edge portion of the panel, the reinforcement member being joined to the panel at the first end surface and the second end surface.

5. The sunroof panel for the vehicle according to claim 1, wherein
the pair of the side frames extends in front-rear directions of the vehicle;
the front frame extends in the vehicle width direction;
the rear frame extends in the vehicle width direction; and
the front frame and the rear frame are made from materials that each includes the specific gravity less than a specific gravity of a material of the pair of the side frames.

* * * * *